United States Patent [19]

Hefer

[11] Patent Number: 4,594,698
[45] Date of Patent: Jun. 10, 1986

[54] PRINTED-CIRCUIT DISC FOR STRINGING GEOPHONES

[75] Inventor: Fred W. Hefer, Houston, Tex.

[73] Assignee: Oyo Corporation, Houston, Tex.

[21] Appl. No.: 663,688

[22] Filed: Oct. 23, 1984

Related U.S. Application Data

[63] Continuation of Ser. No. 309,248, Oct. 7, 1981.

[51] Int. Cl.[4] .......................................... H04R 11/00
[52] U.S. Cl. .................................................. 367/188
[58] Field of Search ............... 367/188, 182, 154, 178

[56] References Cited

U.S. PATENT DOCUMENTS 3,911,388  10/1975  Crump et al. .

Primary Examiner—Theodore M. Blum
Attorney, Agent, or Firm—Michael P. Breston

[57] ABSTRACT

This invention includes a seismic detector located in the bottom portion of a casing. The upper portion of said casing contains a printed circuit disc. The printed circuit disc is provided to serve as a junction between the conductor wires of the geophone leader cable and the geophone's terminals, and to anchor the geophone leader cable to the geophone casing.

9 Claims, 10 Drawing Figures

U.S. Patent  Jun. 10, 1986  Sheet 1 of 2  4,594,698
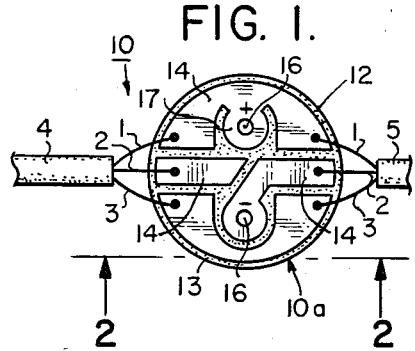
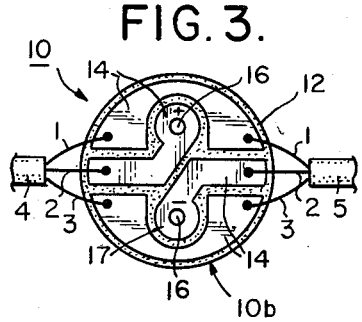
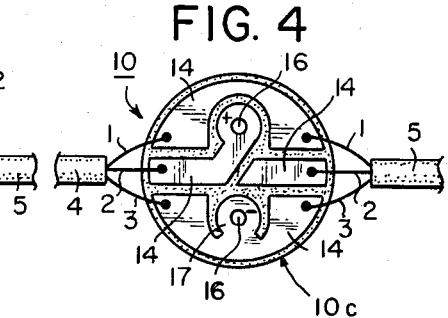
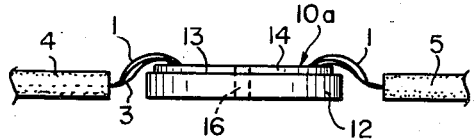
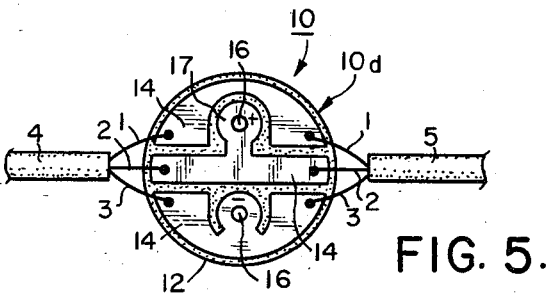
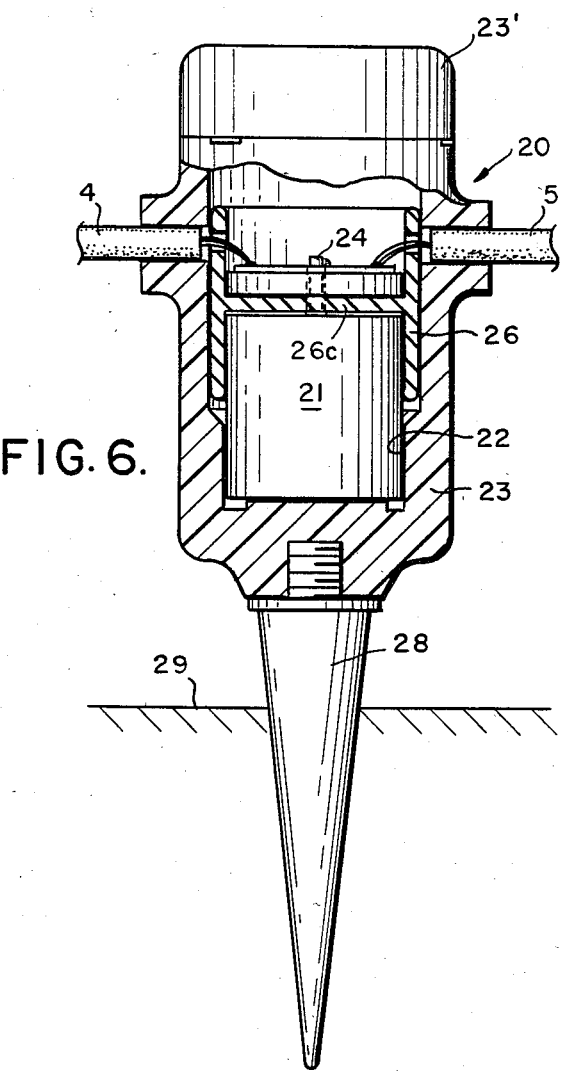
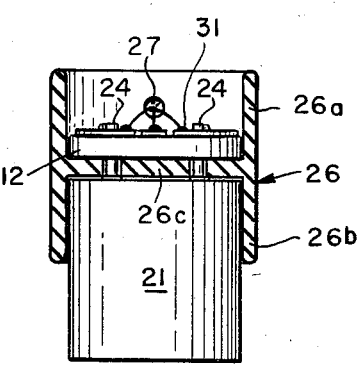
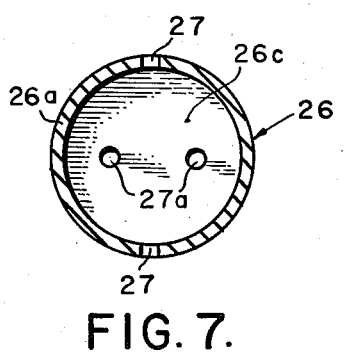

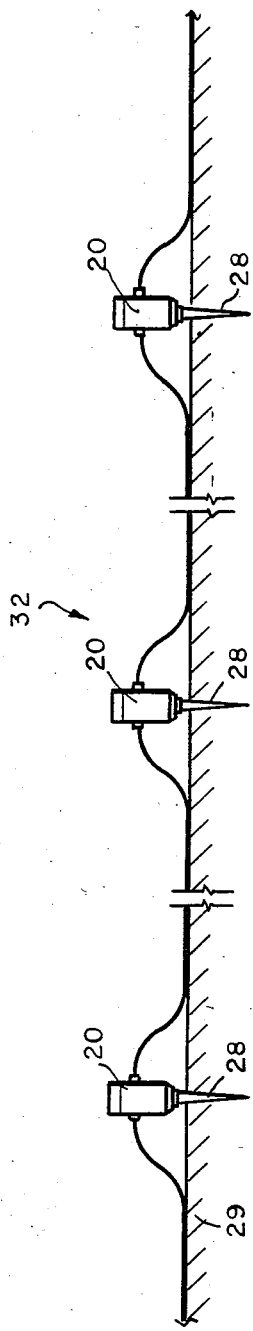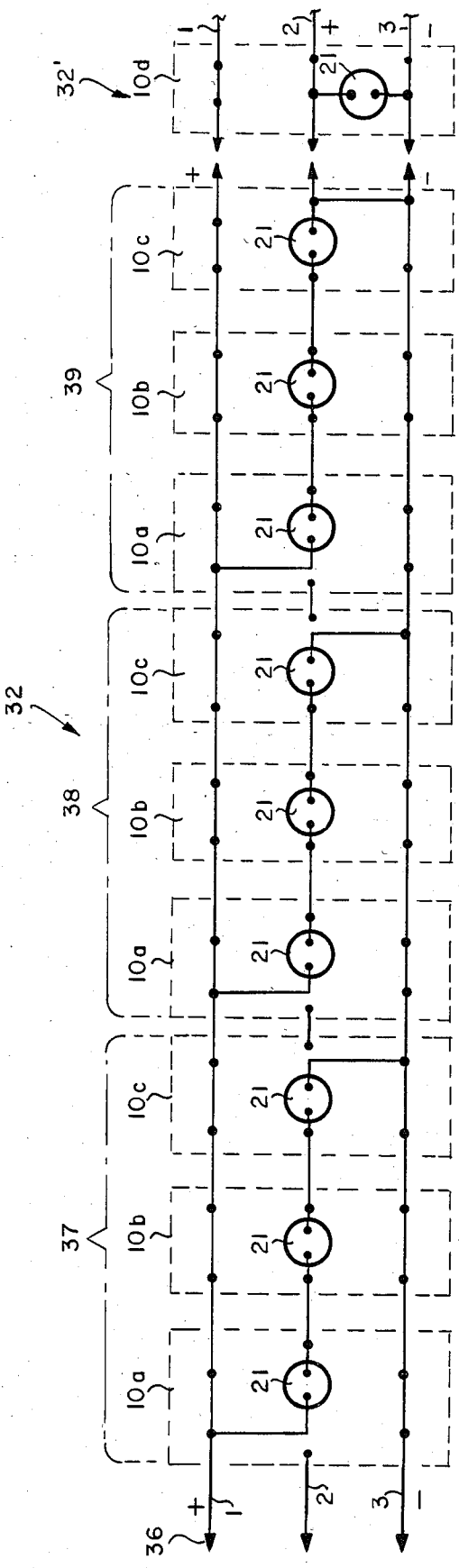
FIG. 9.
FIG. 10.

PRINTED-CIRCUIT DISC FOR STRINGING GEOPHONES

This is a continuation of application Ser. No. 06/309,248 filed 10-7-81.

BACKGROUND OF THE INVENTION

1. Field of the Invention.

A printed-circuit disc is used to interconnect a seismic detector, such as a geophone, with at least one seismic cable.

2. Description of the Prior Art.

In seismic prospecting, whether on dry lands or marsh and swamp areas, "spread" cables are used to interconnect "strings" of geophones to seismic recording instruments. Each string connects two or more geophones having electric junctions along the geophone "leader" wires which are connected to a pair of conductor wires in the spread cable. The geophone casing is implanted into the earth to allow the geophone to detect returned seismic waves.

In practice, the geophones are electrically interconnected into the leader wire at spaced intervals in various networks consisting of series and parallel combinations. The process of interconnecting geophones is commonly referred to as "stringing". The art of geophone stringing has been plagued with numerous problems which are described, for example, in U.S. Pat. Nos. 3,119,978, 3,445,809, 3,930,218, 3,956,575, 3,993,859 and 4,122,433.

As will be appreciated from a detailed study of these patents, the art of connecting geophone terminals to leader cables, of stringing geophones into series and parallel combinations from which cable spreads are formed, and of anchoring geophone leader wire to geophone casings, requires considerable skill and time, both in making the initial assemblies and subsequently in disassembling certain ones of the geophones which require repair. Some repair jobs in the field require special purpose tools which are not generally available in remote areas, as in jungles or swamps.

In certain ones of the prior art methods, T-type couplers are used for joining leader cables. One type of commercially known T-coupler is a completely molded T around the cable's junction thereby providing no access to the electric conductor wires; another type is a fastened T formed from two members which are clamped together around the junction, and then the inside of the T is filled with a suitable potting compound. Both known T-couplers provide a waterproof junction, but the molded T is impossible to repair in the field because the seismic crew has no injection molding equipment, while the fastened T requires considerable skill and time to first dismantle and remove the potting compound and then to reassemble and to reshoot the compound into the T.

Another type coupler for joining three cables is disclosed in said U.S. Pat. No. 3,956,575 which requires no potting compounds, but in this patent, the leader cable is connected to the geophone casing in a conventional manner. This method is still labor-intensive and is prone to human error. Such errors are normally not detected until final checkout is made on the assembled geophone strings and cable spreads. When a defective geophone string is found it is very time-consuming to locate the origin of the trouble which frequently lies in erroneous inter-wire connections.

In addition to the problems encountered while stringing the geophones in the place of manufacture of the geophones and geophone strings, problems also exist in the field use of geophone strings. Thus, cables, couplers, and geophone casings become frequently damaged by physical objects and their outer jackets and housings are eaten up by rodents, or they become damaged by rough handling. If trouble shooting is very time-consuming or costly, sometimes a very expensive entire geophone string may have to be discarded because the fault cannot be easily located.

It is a main object of the present invention to overcome the above-mentioned drawbacks of the known geophone stringing art and to provide a method and means for stringing geophones which allows ready access to and easy recognition of the junctions between geophone leader wires and geophone terminals. The invention reduces considerably the amount of labor required in preparing leader cables, in making connections between the geophone terminals and the leader wires, and in anchoring the leader wires to the geophone casing.

It is a further object of the present invention to reduce, as much as possible, the possibility of human error in the assembly, and the subsequent trouble shooting of the geophone strings, which are, therefore, superior from the standpoint of both cost and reliability.

SUMMARY OF THE INVENTION

In one aspect of the invention there is provided a casing having a base defining a chamber adapted to receive therein the bottom end of a seismic geophone. A printed-circuit disc is provided to serve as a junction box between the conductor wires of the geophone leader cable and the geophone's terminals, and to anchor the geophone leader to the geophone casing. The base, the geophone and the printed-circuit disc are made watertight with a cover removably attached to the base.

Preferably, the printed-circuit disc has a pair of holes axially extending through the disc and through two conductive strips on the disc to allow the geophone's terminals to extend therethrough and become connected to said two strips. Four distinct printed-circuit discs are provided for satisfying the need to make most typical electric connections normally required when making geophone strings. Each type of printed-circuit disc carries a distinct group of spaced conductive strips.

Utilizing these four distinct individual printed-circuit discs, it is possible to interconnect individual geophones in series, parallel, or any combinations thereof. Since the wires in geophone leader cables usually carry distinct color insulating sleeves, the printed-circuit strips can be similarly color coded so as to facilitate the making of the required electrical interconnections with the conductor wires of the leader. It has been found that the soldering of the wires to the conductive strips on the printed-circuit discs serves a double function: that of making the desired electrical interconnections, and that of anchoring the geophones' terminals and the leader wires to certain ones of the strips and to the discs.

BRIEF DESCRIPTION OF THE DRAWINGS

FIGS. 1 and 3-5 are top views of printed-circuit discs, each having a distinct circuit arrangement of conductive strips to interconnect a geophone to certain ones of the wires in a three conductor geophone leader cable;

FIG. 2 is a side view taken on line 2—2 of FIG. 1;

FIG. 6 is a view in elevation, partly in section, showing a geophone casing housing a geophone, a printed-circuit disc, and the ends of the pair of geophone leader sections;

FIG. 7 is a top view of a sleeve interposed between the geophone and the P-C disc;

FIG. 8 is an enlarged view showing the arrangement of the geophone, sleeve and disc;

FIG. 9 is a circuit diagram of the connections made with the discs, shown in FIGS. 1 and 3-5, for typical strings of geophones; and FIG. 10 illustrates the use of the strings of geophones for seismic prospecting.

DESCRIPTION OF THE PREFERRED EMBODIMENTS

The printed-circuit disc is generally designated as 10 and comprises a flat, dielectric, circular disc 12 carrying on one face 13 thereof conductive strips 14 arranged in a distinct circuit pattern. The discs 12 will be illustrated for use in connection with geophone leader cables carrying three conductor wires. Four P-C discs 10a–10d are shown in the drawings, each having a distinct circuit pattern. Each disc serves to connect the pair of geophone terminals 24 between a pair of wires 1-3 in a pair of opposed geophone leader sections 4, 5. For that purpose, each disc 12 has a pair of longitudinal holes 16 extending through a pair of conductive strips 14. Around each hole 16 is provided a circular conductive patch 17. Patches 17 are marked with + and − polarities for connection to the corresponding + and − geophone terminals 24.

The P-C disc 10 is adapted to electrically interconnect the conductor wires 1-3 of the geophone leader cable sections 4 and 5 with the geophone's terminals 24, without the use of leader cables of the type shown, for example, in U.S. Pat. No. 3,956,575. The geophone 21 is housed inside a chamber 22 in the base portion 23 of a geophone casing 20.

To couple the P-C disc 10 to the top end of geophone 21, there is provided an insulating elastic sleeve 26 having an I-shaped cross-section. Sleeve 26 defines an upper cylindrical chamber 26a and a lower cylindrical chamber 26b having a common wall 26c. The top end of geophone 21 is received within chamber 26b and the P-C disc 10 rests on top of wall 26c. The P-C disc 10 is oriented so that the geophone's terminals 24 can extend through holes 27a in the center wall 26c and through the holes 16 in the P-C disc 10. The cylindrical wall of the upper chamber 26a has a pair of diametrically-opposed openings 27 through which extend the conductor wires 1-3 of the cable sections 4-5. A cover 23' makes watertight the casing 20 which can be coupled to the ground 29 through a spike 28.

When the need arises to inspect or repair the electrical interconnections, the cover 23' is removed and all the connections are readily visible. To facilitate assembly and inspection, each conductive strip 14 is painted with the same color as the insulation on the conductor wire. It will be appreciated that when using such a color code, field repair or inspection of the wire connections can be accomplished in a minimum of time.

Typically, each of the conductor wires 1-3 is made up from a plurality of wire strands. The bare end of each conductor has its strands spread apart and filled with a solder ball 31, thereby anchoring the conductor's end to a particular conductor strip 14 on disc 12. Electric continuity between a pair of opposed wires, for example 1—1, exists if the connecting strip 14 is continuous, and continuity does not exist if the strip is discontinuous as is the case in FIG. 1 between wires 2 of leaders 4 and 5. Electric connections between the geophone's terminals 24 are made by electrically soldering the terminals 24 to the corresponding patches 17 having the proper polarities.

With the discs 10a–10d shown in FIGS. 1, 3-5, it will be seen that a geophone or a series of geophones can be connected across a pair of wires in leaders 4 and 5.

The manner of assembly and disassembly of the geophone casing should be obvious from the drawings. The leader sections 4 and 5 are made to pass through the bores 27 of sleeve 26. The strands of the bare ends of conductor wires 1-3 are spead apart and filled with solder balls 31 and connected with the appropriate strips 14 on the P-C disc. Then the geophone's terminals 24 are also soldered to the conductive patches 17 surrounding them.

When all the soldered junctions are made, cover 23' is coupled to base 23, whereby base 23 and cover 23' will sealingly engage the outer jackets of the leader sections 4 and 5, thereby rendering casing 20 watertight. Other known waterproofing means can be employed to make casing 20 watertight.

Cover 23' can be easily taken off by hand or with a screwdriver, thereby immediately exposing the inter-conductor and the geophone terminal junctions for inspection, testing, repair and alterations. The assembly and disassembly of each geophone casing 20 and its P-C disc 10 requires simple tools which are readily available to the seismic crew.

It will be also appreciated that in addition to serving as a junction means for the leader sections 4-5 and for the geophone terminals 24, the P-C disc 10 also serves as an anchoring means for the wires 1-3 of the leaders.

FIG. 9 shows a wiring diagram of an assembly 32 consisting of three strings 37-39 of geophones. Each of strings 37-39 includes three geophones 21 interconnected in series with the aid of P-C discs 10a–10c. These P-C discs also connect the three strings in parallel across "through" wires 1 and 3. A second assembly 32' can be made, for example, with the aid of P-C disc 10d, wherein geophones 21 are connected in parallel across wires 2 and 3. The above wiring diagrams are merely illustrative of how the P-C discs 10a–10d can be put to use. Each assembly 32 or 32' has connecting means 36 at both ends thereof for connection to other assemblies.

The above and other advantages, as well as modifications of the preferred embodiments illustrated in the drawings, will readily become apparent to those skilled in the art.

What is claimed is:

1. In combination:
   a connector insulator disc having a dielectric element and flat conductive strips on one face of the element, the strips being arranged in spaced insulated relation, the dielectric element having a pair of transverse holes which extend between the opposite faces of the disc and through a pair of particular conductive strips; and
   a seismic detector having a pair of external terminals, each terminal extending through a particular corresponding hole and through the conductive strip surrounding such hole.

2. The combination of claim 1, and at least two insulated conductors having bare ends, each bare end being disposed over and substantially parallel to a particular conductive strip; and solder means galvanically and mechanically anchoring each bare end to its associated conductive strip, and said solder means also galvanically connecting each detector terminal to its associated strip, whereby each bare end is mechanically anchored to the disc so that the disc can withstand and resist longitudinal pulls on the conductors in a direction away from the detector.

3. The combination of claim 1, wherein the disc is circular and is positioned above and outside of the casing of the detector.

4. The combination of claim 2, wherein the disc is circular and the disk and said conductors are separable from the detector by unsoldering only the detector's terminals from their associated conductive strips.

5. In combination:

a circular connector disc having a dielectric element and flat conductive strips on one face of the element, the strips being arranged in spaced insulated relation, the dielectric element having a pair of transverse holes which extend between the opposite faces of the disc and through a pair of particular conductive strips;

a seismic detector having a pair of external terminals, each terminal extending through a particular corresponding hole and through the conductive strip surrounding such hole;

a pair of cables, each cable having at least two conductors, each conductor having a bare end which is disposed over and substantially parallel to a particular conductive strips; and solder means galvanically and mechanically anchoring each bare end to its associated conductive strip, said solder means galvanically connecting each detector terminal to its associated strip, whereby each bare end is mechanically anchored to the disc so that the disc can withstand and resist longitudinal pulls on the cables in a direction away from the detector.

6. The combinatin of claim 5, and a hollow housing having an internal chamber dimensioned to house said detector; and cover means removably enclosing said detector, said disc, and said cables within said casing.

7. In combination:

a flat, dielectric, circular connector disc;

a geophone having a pair of external terminals; and a pair of geophone leader cables;

said disc having on one face thereof conductive strips, a pair of longitudinal holes extending between the opposite faces of the disc and extending through a pair of particular conductive strips, said conductive strips interconecting said cables between themselves and with the geophone's external terminals;

each cable having at least a pair of conductors, each conductor having a plurality of wire strands, the bar end of each conductor being filled with solder, thereby anchoring the conductor's bare end to a particular conductive strip on the disc;

a housing having a chamber, the geophone being housed inside the chamber;

an insulating elastic sleeve coupling the disc to the top end of the geophone, the sleeve having an I-shaped cross-section and defining an upper cylindrical chamber, a lower cylindrical chamber, said sleeve chambers having a common wall defining a pair of longitudinal holes therein;

the top end of the geophone being positioned within said lower chamber and the disc resting within said upper chamber on top of said common wall, the disc being oriented so that the geophone's terminals extend through the holes in said common wall and through the holes in said disc;

the cylindrical wall of said sleeve's upper chamber having a pair of diametrically-opposed openings through which extend said cables; and a cover for said casing to waterproof said casing chamber.

8. A method of stringing seismic detectors comprising:

positioning a connector disc over a detector, the disk having a dielectric element and flat conductive strips on one face of the element, the strips being arranged in spaced insulated relation, the dielectric element having a pair of transverse holes which extend between the opposite faces of the disc and through a pair of particular conductive strips, and the seismic detector having a pair of external terminals, each terminal extending through a particular corresponding hole in said element and through the conductive strip surrounding such hole;

utilzing at least two insulated conductors having bare ends, each bare end being disposed over and substantially parallel to a particular conductive anchor strip;

soldering each detector terminal to its strip; and soldering each bare end to its associated conductive anchor strip, thereby galvanically connecting each detector terminal to its associated strip, and mechanically anchoring each bare end to its anchor strip whereby the disc withstands and resists strong longitudinal pulls on the conductors in a direction away from the detector, and the conductors are galvanically interconnected through the anchor strips.

9. The method of claim 1, wherein the disc is circular and is positioned above and outside of the casing of the detector.

* * * * *